United States Patent
Aschoff et al.

(10) Patent No.: US 6,918,416 B2
(45) Date of Patent: Jul. 19, 2005

(54) FUEL TANK INSTALLATION

(75) Inventors: Wolfgang Aschoff, Stuttgart (DE);
Jurgen Kraus, Esslingen (DE);
Wolfgang Liebhart, München (DE)

(73) Assignee: DaimlerChrysler AG, Stuttgart (DE)

( * ) Notice: Subject to any disclaimer, the term of this patent is extended or adjusted under 35 U.S.C. 154(b) by 117 days.

(21) Appl. No.: 10/601,010

(22) Filed: Jun. 20, 2003

(65) Prior Publication Data

US 2005/0016625 A1 Jan. 27, 2005

(30) Foreign Application Priority Data

Jun. 20, 2002 (DE) .......................................... 102 27 471

(51) Int. Cl.[7] .............................................. B65B 31/00
(52) U.S. Cl. .............................. 141/59; 141/63; 141/94; 141/302
(58) Field of Search ............................. 141/4–8, 44–46, 141/59, 63, 94–96, 302

(56) References Cited

U.S. PATENT DOCUMENTS 6,167,920 B1 * 1/2001 Enge .............................. 141/5

FOREIGN PATENT DOCUMENTS

| DE | 34 42 149 | 5/1986 |
| DE | 196 42 308 | 4/1997 |

* cited by examiner

*Primary Examiner*—Justine R. Yu
*Assistant Examiner*—Peter deVore
(74) *Attorney, Agent, or Firm*—Klaus J. Bach

(57) ABSTRACT

In a fuel tank installation including a fuel tank with an expansion volume, a filler neck connected to the fuel tank for refueling, a fill vent line for venting the fuel tank during refueling and an operating vent line for venting the expansion volume of the tank, electrically operable valve means for blocking the operating vent line are arranged in a penetration area of the fuel tank where the operating vent line extends through the fuel tank.

5 Claims, 1 Drawing Sheet

FUEL TANK INSTALLATION

BACKGROUND OF THE INVENTION

The invention relates to a fuel tank installation, particularly for a motor vehicle, comprising a fuel tank with a filler neck extending to the fuel tank, a fill vent line for venting the fuel tank during the filling procedure, an operating vent line for venting an expansion volume in the fuel tank above a maximum fill level and means for blocking the operating vent line particularly during the filling procedure.

DE 34 42 149 A1 discloses a fuel tank installation wherein a fuel tank is provided with a filler neck connected to the fuel tank below the highest fill level of the fuel in the tank and with a fill vent line and several operating vent lines. The operating vent lines extend to a valve arranged in the area of the filler neck. Upon inserting a refueling nozzle into the filler neck, the valve is operated and closes the operating vent lines. In this way, the maximum fuel level in the fuel tank is determined solely by the location of the end of the fill vent line in the fuel tank. The valve is operated by a piston rod, which extends parallel to the filler neck and which is actuated when the refueling nozzle is inserted into the filler neck.

DE 196 42 308 A1 discloses a fuel tank installation wherein the operating vent line extends up to the top end of the refueling filler neck for the insertion of a refueling nozzle. The end of the filler neck is provided with annular sealing lips, which closely surround a refueling nozzle tube. Upon insertion of the refueling nozzle, the operating vent lines are closed by the tube of the refueling nozzle.

It is the object of the invention to provide a fuel tank installation including a fuel tank with a simplified blockable operating vent arrangement.

SUMMARY OF THE INVENTION

In a fuel tank installation including a fuel tank with an expansion volume, a filler neck connected to the fuel tank for refueling, a fill vent line for venting the fuel tank during refueling and an operating vent line for venting the expansion volume, electrically operable valve means for blocking the operating vent line are arranged in a penetration area of the fuel tank where the operating vent line extends through the fuel tank.

With such an arrangement, the operating vent line can be blocked directly at the tank. On one hand, the provision of the blocking means in the tank or in the immediate vicinity of the connecting nipples where the vent line extends through the tank wall is space saving, and, on the other hand, the vent lines can be blocked near their origin. The vent line may be blocked still within the fuel tank, wherein the additional line connections needed for the blocking means would be disposed within the tank and could result in increased HC emissions into the area around the tank if they are not 100% gas tight. Alternatively, the blocking means might be arranged directly at the outside of the tank, for example, in the area of the connecting nipples of the operating vent line, that is, in an area where line sections of the vent line have to be connected anyhow. The provision of the blocking means therefore does not increase the number of connecting points, which represent potential leakage locations for HC emissions. The arrangement according to the invention therefore provides for a simple space-saving setup with relatively few seal- or, respectively, connector locations and consequently with relatively few potential leakage sources.

Preferably, a sensor is provided in the area of the filler neck for sensing the insertion of a refueling nozzle, which sensor provides an output signal which is supplied to the blocking means.

In this way, the operating vent lines can be blocked upon insertion of a refueling nozzle into the filler neck of a tank. The sensor signal may also be processed in a processor so as to provide for a delayed blocking of the vent line.

In a particular embodiment of the invention, the blocking means is a control valve arranged within the tank. In this way, the fuel tank installation is of very space-saving design. Furthermore, there are no valve connectors outside the tank so that the number of potential leakage points is reduced.

In another embodiment, the control valve is arranged within the tank in the area of a vent chamber to which a vent line is connected.

In this way, several operating vent lines, which for example are in communication with different chambers of a fuel tank can be combined and blocked together within the fuel tank by a single control valve.

In still another embodiment of the invention, an operation vent chamber extends annularly around an opening of the fill vent line in the fuel tank.

With this design, a compact arrangement is achieved and the mouth of the fill vent line to the fuel tank and the penetration of the operation vent line through the wall of the fuel tank can be achieved by a common component such that only a single opening in the wall of the fuel tank is required.

In a further embodiment of the invention, the control valve is arranged, together with a float valve which is arranged within the fuel tank and which controls the communication of the fill vent line with the fuel tank, in a common housing.

This arrangement is space-saving as it requires only a single combination component for the blocking of the operation vent lines and fill vent line.

Also, a control valve may be provided for controlling a communication opening between the operation vent lines and the fill vent line.

This arrangement may also be employed to use the fill vent line as a venting arrangement for the operating vent line or lines so that an additional vent volume for the operating vent lines outside the fuel tank can be eliminated.

Various features and advantages of the invention will become apparent from the following description of the invention on the basis of the accompanying drawings.

DESCRIPTION OF A PARTICULAR EMBODIMENT OF THE INVENTION

Figure 1:
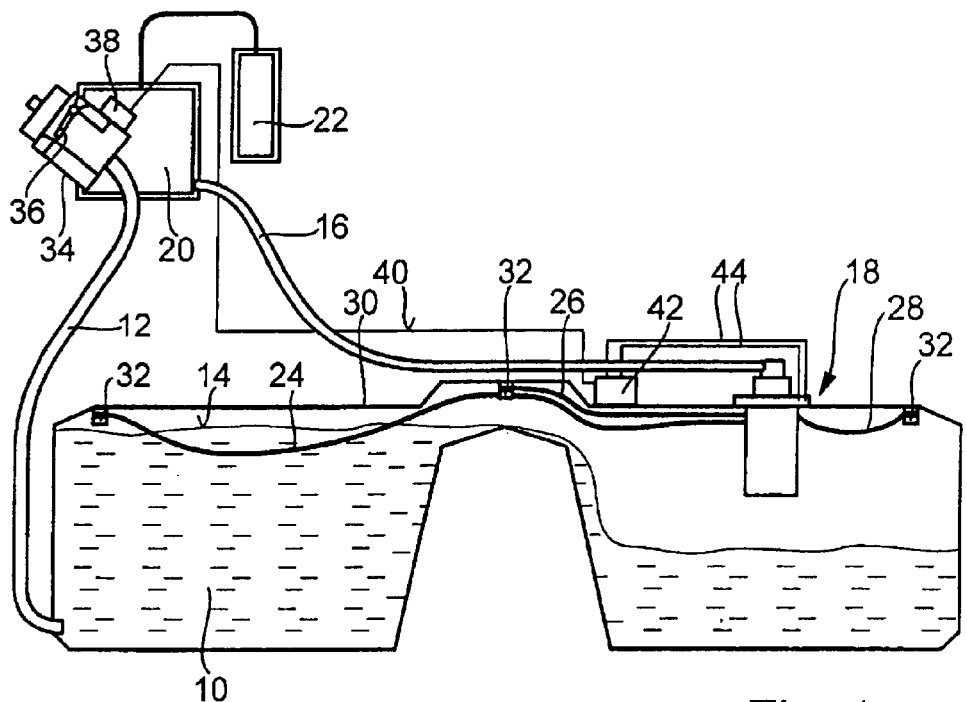
FIG. 1 is a schematic representation of a preferred embodiment of a fuel tank installation according to the invention.

FIG. 1 shows schematically a fuel tank installation including a fuel tank 10 with a filler neck 12, which is connected to the fuel tank 10 below the maximum fill level 14 of the tank. In order to be able to vent the fuel tank 10 during refueling, a fill vent line 16 is provided, which is in communication, by way of a float valve 18, with the interior of the fuel tank 10 and also with an expansion container 20 and an activated carbon filter 22. When the fuel level in the fuel tank 10 reaches the maximum fill level 14, a float in the float valve 18 blocks communication between the fill vent line 16 and the interior of the fuel tank 10 so that it cannot be further filled. The fuel tank 10 is in the form of a so-called saddle tank and is shown in FIG. 1 to be three quarters full. As shown in FIG. 1, the left part of the saddle tank is filled to the maximum fill level 14. However, the float valve 18 which is arranged in the right part of the tank will terminate the refueling process only when the maximum fill level 14 has been reached also in the right part of the fuel tank 10.

Above the maximum fuel level 14, there is an expansion volume so that heating and expansion of the fuel in the tank will not result in an overflow and discharge of fuel through the filler neck 12 even when the tank has been filled to the maximum fuel level 14. But also this expansion volume must be vented since in this expansion volume a gas mixture of air and fuel vapors is formed whose pressure could rise to substantial values with high ambient temperatures. In order to prevent such rise in pressure, an operating vent system is provided which includes three operating vent lines 24, 26 and 28. The openings of the vent lines 24, 26 and 28 are arranged each immediately below the upper wall 30 of the fuel tank 10 and are each provided with a float valve 32. The open ends of the operating vent lines 24, 26 and 28 are so arranged in the fuel tank that appropriate venting of the expansion volume is provided under any circumstances, that is, when the vehicle negotiates a curve or is in an inclined position. With the float valves 32 fuel flow into the vent lines 24, 26, and 28 is prevented when the vehicle negotiates a curve or is in an inclined position. By providing float valves 32 in the operating vent lines 24, 26 and 28, sections of the vent lines may extend through areas below the maximum fill level 14 and these sections will not be filled with fuel.

When the fuel in the fuel tank 10 has reached the maximum fill level 14, the float valve 18 blocks the communication between the fuel tank 10 and the fill vent line 16. With further filling of the fuel tank 10, venting could occur however by way of the operating vent lines 24, 26, and 28. To prevent this, the float valve 18 includes means for blocking the vent lines 24, 26, and 28. Within the float valve 18, the operating vent lines 24, 26 and 28 are in communication with the fill vent line 16 and this communication remains open even when an opening of the fill vent line 16 in the fuel tank 10 is closed by the float valve 18.

For blocking the operating vent lines 24, 26 and 28 during the refueling of the fuel tank 10, a sensor 38 coupled with a so-called lead free control flap 36 is provided in a filler neck head 34. When a refueling nozzle is inserted into the filler neck head 34, the lead-free fuel flap 36 is pivoted open which movement is sensed by the sensor 38 which then supplies a signal, to a control block 42 by way of line 40. By way of the control block 42, an electric actuator in the float valve 18 can be activated via the electric lines 44. By means of the electric actuator, a connection between the operating vent lines 24, 26, and 28 end the fill vent line 16 can be closed or opened.

Figure 2:
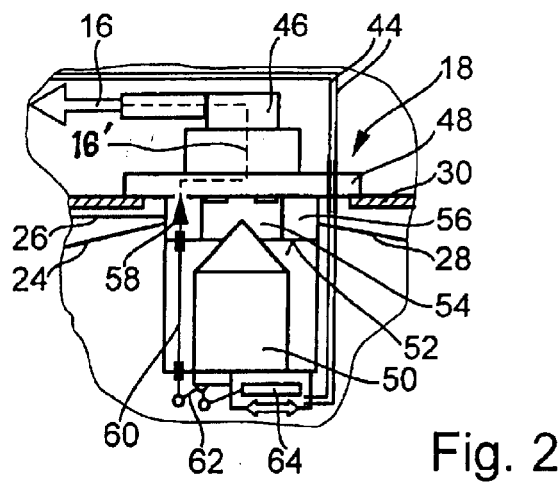
FIG. 2 shows in detail a venting control arrangement of the fuel tank installation shown in FIG. 1.

FIG. 2 shows the float valve 18 in detail. A housing 46 of the float valve 18 includes an annular flange 48 which covers an opening in the wall 30 of the fuel tank 10. Since also the electrical connecting lines 44 extend through this annular flange 48, the fuel tank installation according to FIG. 1 requires only one penetration in the wall 30 of the fuel tank 10 for operating vent lines 24, 26, and 28 and the fill vent line 16 as well as the electrical lines 44.

Within the housing 46, there is a float 50, which is cylindrical and has a cone-shaped end. When the fuel level in the fuel tank 50 rises to the maximum level 14 the float 50 rises and closes with its cone shaped end an opening in an annular flange 52 of the housing 46 leading to the fill vent line 16 in the fuel tank 10. The annular flange 52 forms the end of a channel 54, which extends the fill vent line 16 through the housing 46. The section of the channel 54 immediately adjacent the annular flange 52 is surrounded by an annular operating vent chamber 56 to which the operation vent lines 24, 26 and 28 extend. Between the operating vent chamber 56 and the channel 54, or, respectively, the fill vent line 16, there is within the housing 46a a communication passage, which is indicated in FIG. 2 by a dashed line 16'. This communication passage 16' can be closed by a cone member 58, which is arranged at the end of a movable operating rod 60. The cone member 58 is arranged within the operating vent chamber 56 and can be biased into the opening between the operating vent chamber 56 and the channel 40 by means of the operating rod 60 within the housing 46. The operating rod 60 extends by way of a structure seal through the annular flange 52 which, in FIG. 2 represents the lower limit of the operating vent chamber 56. The operating rod 60 also extends through the float chamber of the housing 46 including the float 50 and out of the float chamber by way of another seal structure.

The end of the operating rod 60 opposite the cone member 58 is supported by a first arm of a double-armed lever 62, which is pivotally supported on the housing 46. The second arm of the lever 62 is connected to an electrical actuator 64, such as an actuating magnet, which is supported so as to be movable in the direction indicated by the double arrow shown in FIG. 2. By energizing the electrical actuator 64, the cone member 58 can be biased, by way of the double arm lever 62 and the operating rod 60, into the opening in the upper end wall of the operating vent chamber 56. In this way, the communication opening between the operating vent chamber 56 and the fill vent line 16 can be closed.

It is pointed out that, in accordance with the invention, the electrical control valve for blocking the operating vent lines 24, 26 and 28 and the float valve for blocking or opening the fill vent line 16 are integrated into a common housing 46. As a result, the fuel tank installation arrangement is relatively simple and only a few potential leakage locations for HC emissions are present.

The energization of the electrical actuators 64 by the control block 42 and the sensor 38 facilitates a flexible intelligent control for venting the fuel tank 10.

With the electrical activation of the blocking means for the operating vent lines 24, 26, 28, these lines can be blocked still within the fuel tank 10.

Figure 3:
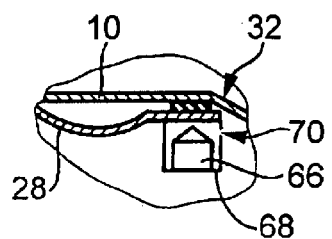
FIG. 3 shows another detail feature.

FIG. 3 shows one of the float valves 32 in an enlarged representation. Each float valve 32 includes a cylindrical float 66 provided with a cone-shaped end section. When lifted by a rising liquid level, the float 66 blocks with its cone-shaped end section a communication passage from the interior of the fuel tank 10 to one of the operating vent lines 24, 26 and 28. As shown in FIG. 3, the float 66 is arranged in float chamber 68. Communication between the float chamber 68 and the interior of the fuel tank 10 is established by way of a bore 70 in the wall of the float chamber 68. By a suitable dimensioning of the bore 70, the air or gas discharge from the tank through the bore 70 to the respective vent operating vent lines 24, 26 and 28 can be throttled.

What is claimed is:

1. A fuel tank installation, comprising a fuel tank with an expansion volume, a filler neck extending to the fuel tank for refueling said tank, a fill vent line in communication with the fuel tank for venting the fuel tank during refueling, an operating vent line for venting the expansion volume in the fuel tank and means for blocking the operating vent line including an electrically controllable valve, said electrically controllable valve being arranged in a penetration area in which the operating vent line extends through a wall portion of said tank and within a vent housing together with a float valve which opens or closes a communication path between the fill vent line and the fuel tank, said electrically operating valve being arranged in the communication path between the operating vent line and the fill vent line so as to open or close the communication path.

2. A fuel tank installation according to claim 1, wherein a sensor is arranged in the area of the filler neck so as to sense the insertion of a refueling nozzle into the filler neck, said sensor, upon sensing the presence of a refueling nozzle in the filler neck providing a signal for actuating said electrically controllable valve, to close the communication path during refueling.

3. A fuel tank installation according to claim 1, wherein said electrically controllable valve is arranged within said fuel tank.

4. A fuel tank installation according to claim 3, wherein said tank includes expansion volumes and float valves are arranged within said expansion volumes within the fuel tank and an operating vent line extends from each float valve to an operating vent chamber in the vent housing.

5. A fuel tank installation according to claim 4, wherein said operating vent chamber extends annularly around a fill vent chamber in the vent housing.

* * * * *